Aug. 4, 1953 H. L. BUSH 2,647,699

CONTINUOUS GRIP TRANSMISSION LINE APPARATUS

Filed Jan. 6, 1951 6 Sheets-Sheet 1

INVENTOR.
HARLEIGH L. BUSH
BY
Lyon & Lyon
ATTORNEYS

CONTINUOUS GRIP TRANSMISSION LINE APPARATUS

Filed Jan. 6, 1951 6 Sheets-Sheet 2

INVENTOR.
HARLEIGH L. BUSH
BY Lyon & Lyon
ATTORNEYS

INVENTOR.
HARLEIGH L. BUSH
BY
Lyon & Lyon
ATTORNEYS

INVENTOR.
HARLEIGH L. BUSH
BY Lyon & Lyon
ATTORNEYS

INVENTOR.
HARLEIGH L. BUSH
BY Lyon & Lyon
ATTORNEYS

Aug. 4, 1953 H. L. BUSH 2,647,699

CONTINUOUS GRIP TRANSMISSION LINE APPARATUS

Filed Jan. 6, 1951

6 Sheets-Sheet 6

INVENTOR.
HARLEIGH L. BUSH
BY Lyon & Lyon
ATTORNEYS

Patented Aug. 4, 1953

2,647,699

UNITED STATES PATENT OFFICE 2,647,699

CONTINUOUS GRIP TRANSMISSION LINE APPARATUS

Harleigh L. Bush, El Centro, Calif.

Application January 6, 1951, Serial No. 204,735

5 Claims. (Cl. 242—54)

The present invention relates to a method and apparatus useful in unreeling a transmission line cable from a supply reel and disposing the cable adjacent transmission towers or poles to which it is subsequently fastened.

It is desirable, particularly in high voltage transmission lines, that the outer surface of the line or cable be smooth and unabraded to minimize corona losses. High voltage transmission lines are usually made of spirally wound aluminum conductors with a central section comprising a plurality of similarly spirally wound steel wires for strength. The other aluminum conductors are relatively soft and are easily abraded, particularly if the cable or line is allowed to drag along the surface of the ground. It is therefore desirable that the equipment utilized in de-reeling cable from its reel and suspending it in position for fastening adjacent a tower or pole be such that there is no likelihood that the cable be allowed to drag or touch the ground. It is therefore one of the objects of the present invention to provide improved equipment for achieving the above desideratum.

The present invention therefore contemplates the use of novel equipment which renders unnecessary the provision of auxiliary structures similar to saw horses spaced between towers for preventing the cable touching the ground. The use of the equipment therefore is intended to save the labor and expense which would otherwise be required in furnishing and disposing these auxiliary structures between towers. Further, the equipment shown herein is useful in stringing transmission lines over canyons, ravines, rivers and the like where the provision of auxiliary structure between the suspension points would be expensive, impractical or impossible.

The cable or transmission line operated on by the present equipment may, for example, have an outside diameter of approximately 1⅛ inches and may consist of multilayers of aluminum wire, there being, for example, three layers of aluminum wires and three inner layers of steel wire, there being a total of seven steel wires and 54 aluminum wires spirally wound. The outer layer may consist of 24 aluminum wires or strands, the second layer may consist of 18 aluminum wires or strands, and the third layer may consist of 12 aluminum wires or strands. The aluminum wires comprising the outer layer, for example, are wound in a clockwise direction, and the aluminum wires comprising the succeeding layers are wound respectively in the counter-clockwise and clockwise directions, so that wires in adjacent layers are wound in opposite directions. In working with a cable of this structure, problems are presented in de-reeling the cable from its supply reel in the process of suspending the same. For example, the line as wound on the reel may have different sections stressed and bent differently, depending upon whether the particular section considered forms an inner convolution on the reel or an outer convolution. In other words, upon unwinding or de-reeling the cable there is a tendency for different sections of the cable to "birdcage," i. e., the strands or wires comprising the outer layer of the cable may separate instead of lying in adjacent contacting relation with one another as intended. Heretofore, such "birdcaging" resulting from de-reeling the cable from the reel has been tolerated and its effect minimized by allowing the cable, after the de-reeling operation, to remain suspended between towers for one or two days within which the stresses along the cable may be equalized, and before the cable is permanently fastened to the towers.

The present invention contemplates the provision of apparatus whereby the outer strands of the cable are compacted when and as the cable is de-reeled in the process of suspending the same between towers so as to prevent "birdcaging," and to avoid the necessity of waiting one or two days, otherwise required, for the cable to assume a uniform condition along its length. Stated in other words, the present invention contemplates apparatus whereby a length of transmission line may be installed satisfactorily in a short time compared with prior art techniques.

Generally, the present invention contemplates the use of tractors or other vehicles to pull the cable, after it passes from its reel, through a novel device which incorporates means for resiliently gripping the cable and a brake for minimizing the speed at which the cable otherwise would be pulled by the tractor. By providing this device, the cable on the reel itself is not tensioned as a result of the force exerted by the tractor or vehicle, but all of the tension is taken by the device itself. By thus providing such device, the cable may be de-reeled from its reel in an orderly fashion and without adjacent convolutions abrading one another.

The present invention thus also contemplates the provision of a device whereby a cable may be paid out from its supply reel and suspended from towers without appreciably tensioning the cable while it is on the reel, thus producing obvious advantages.

By thus providing means whereby the cable on the reel is not tensioned while being paid out, the spacing between towers may be increased since such spacing heretofore was limited by the amount of tension which could be exerted on the cable while still on the reel. Stated in other words, by appreciably minimizing the tension on the cable while still on the reel, the distance between towers may be increased and greater lengths of cable may be pulled, thereby minimizing the number of splicings required and allowing the use of substantially all of the cable originally supplied on the reel without appreciable waste.

The present invention, since it allows the spacing between towers to be increased, is particularly desirable in those instances where rivers, canyons, ravines and the like present problems.

Further, the present invention contemplates the provision of improved means whereby the cable as it is being paid out from the reel moves in a substantially straight line and is prevented from waving from side to side.

Generally, the present invention contemplates the provision of a combined cable gripping and braking structure through which the cable passes in its passage from the reel to the towers, and the provision of means whereby the composite structure may be moved relative to the reel in accordance with the pitch of the strands forming the outer layer of the cable, to thereby avoid "birdcaging."

It is therefore an object of the present invention to provide an improved method and means whereby the aforementioned results may be obtained.

Another object of the present invention is to provide improved apparatus for these general purposes which allows speedy stringing and installation of high voltage cable.

Another object of the present invention is to provide improved apparatus of this character which allows transmission towers to be spaced a greater distance, a subsidiary object being that the apparatus facilitates the stringing of cable over rivers, canyons, ravines, and the like, even though they necessitate towers spaced a relatively long distance.

Another object of the present invention is to provide apparatus of this character which serves to prevent stressing of the cable yet remaining reeled on the supply reel.

Another object of the present invention is to provide apparatus of this character, the use of which allows immediate fastening of the cable onto the towers without the necessity of waiting for localized stresses in the cable, otherwise produced, to expend themselves.

Another object of the present invention is to provide improved apparatus of this character which prevents the formation of "birdcages" in dereeled cable which comprises a plurality of spirally wound strands, and, in fact, to uniformly compact such strands of the cable in its outward passage to the towers, to thereby cause neutralization of localized stresses which are otherwise produced.

Another object of the present invention is to provide improved apparatus of this character which is portable and yet incorporates the aforementioned advantages, a subsidiary object being that the apparatus incorporates ballast tanks which may be filled with water, sand or the like to provide a stable anchor for one end of the cable as it is being strung between towers.

Another object of the present invention is to provide improved apparatus of this character which allows utilization of all of the cable on the supply reel, the apparatus incorporating for this purpose auxiliary gripping means which does not depend for its operation on binding of the last cable turns on the supply reel.

Another object of the present invention is to provide improved apparatus of this character which requires a minimum number of personnel and eliminates some of the apparatus heretofore required in these operations; for example, cable supporting structures disposed between towers.

Another object of the present invention is to provide improved apparatus of this character which incorporates as a feature thereof, cable gripping and braking means to prevent stressing of the cable on the supply reel, a subsidiary feature being that such means is allowed to turn about the axis of the dereeled cable to prevent the formation of "birdcages" in those instances where the cable comprises a plurality of spirally wound strands.

Another object of the present invention is to provide improved apparatus of the character mentioned in the preceding paragraph, characterized further, however, by the fact that the gripping means functions to continuously grip the cable when and as it is being dereeled and strung between towers.

Another object of the present invention is to provide an improved cable gripping means of this type characterized by its simplicity and ruggedness.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2:
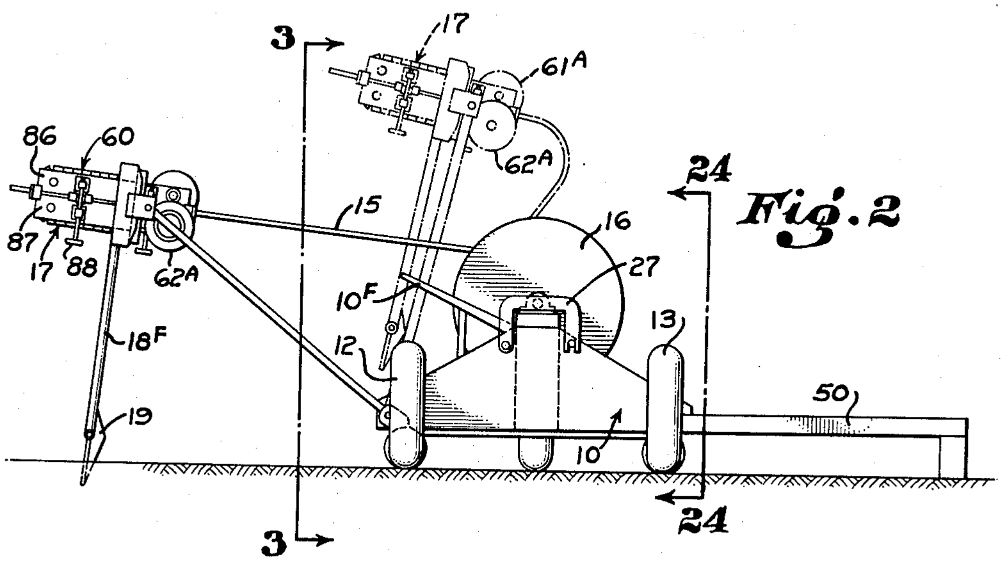
Figure 2 is a view in side elevation taken substantially on the line 2—2 of Figure 1.
Figure 26:
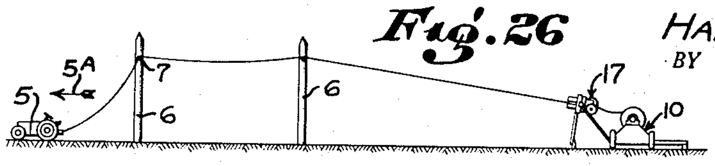
Figures 4, 5:
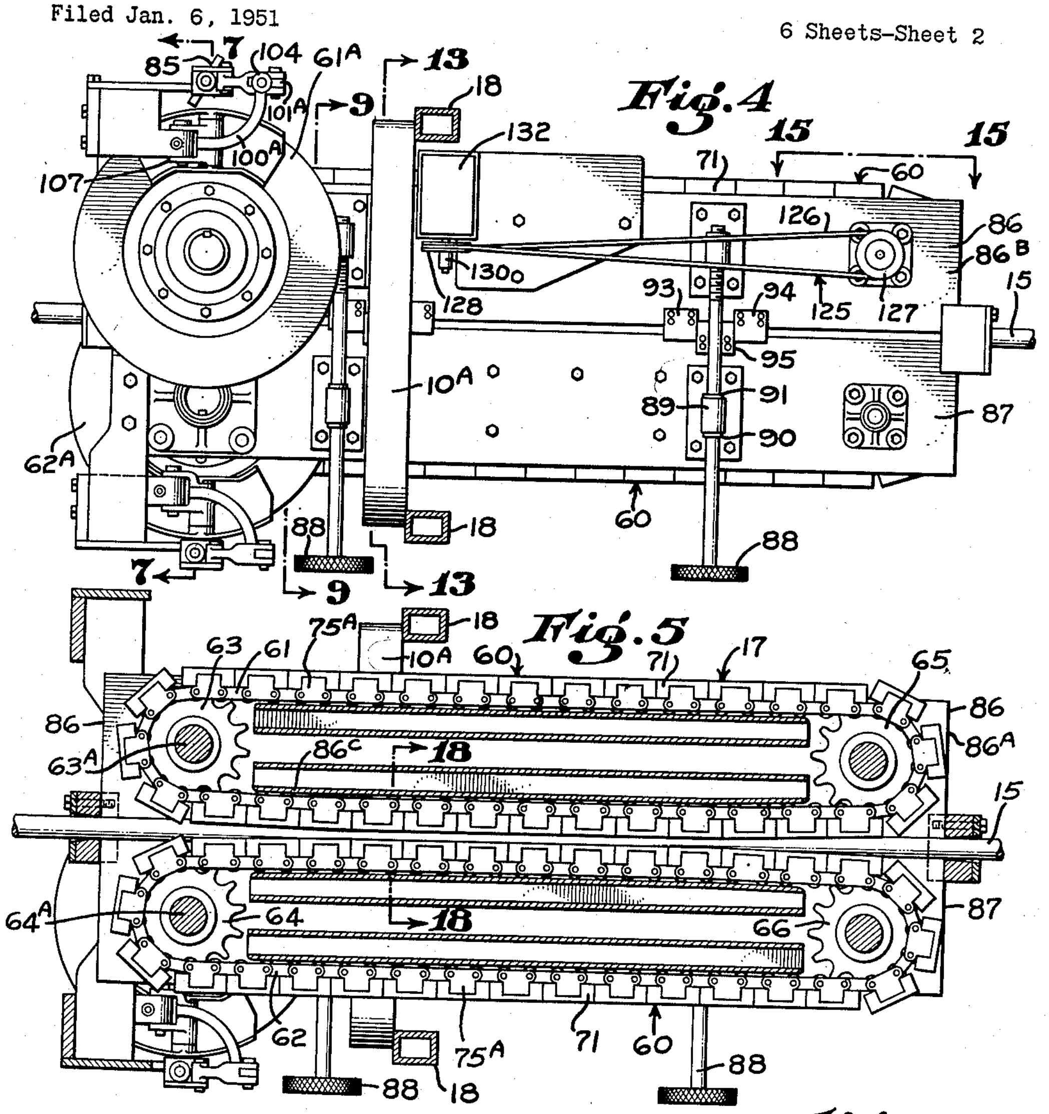
Figure 4 is a view in side elevation taken generally in the direction indicated by the lines 4—4 in Figure 1 of the combination cable gripping and brake device embodying features of the present invention.
Figure 5 is a sectional view through the device shown in Figure 4 and corresponds to a view taken substantially on the line 5—5 of Figure 7.
Figure 27:
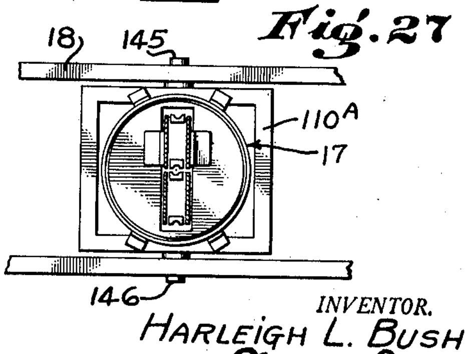
Figures 7, 8, 9, 10:
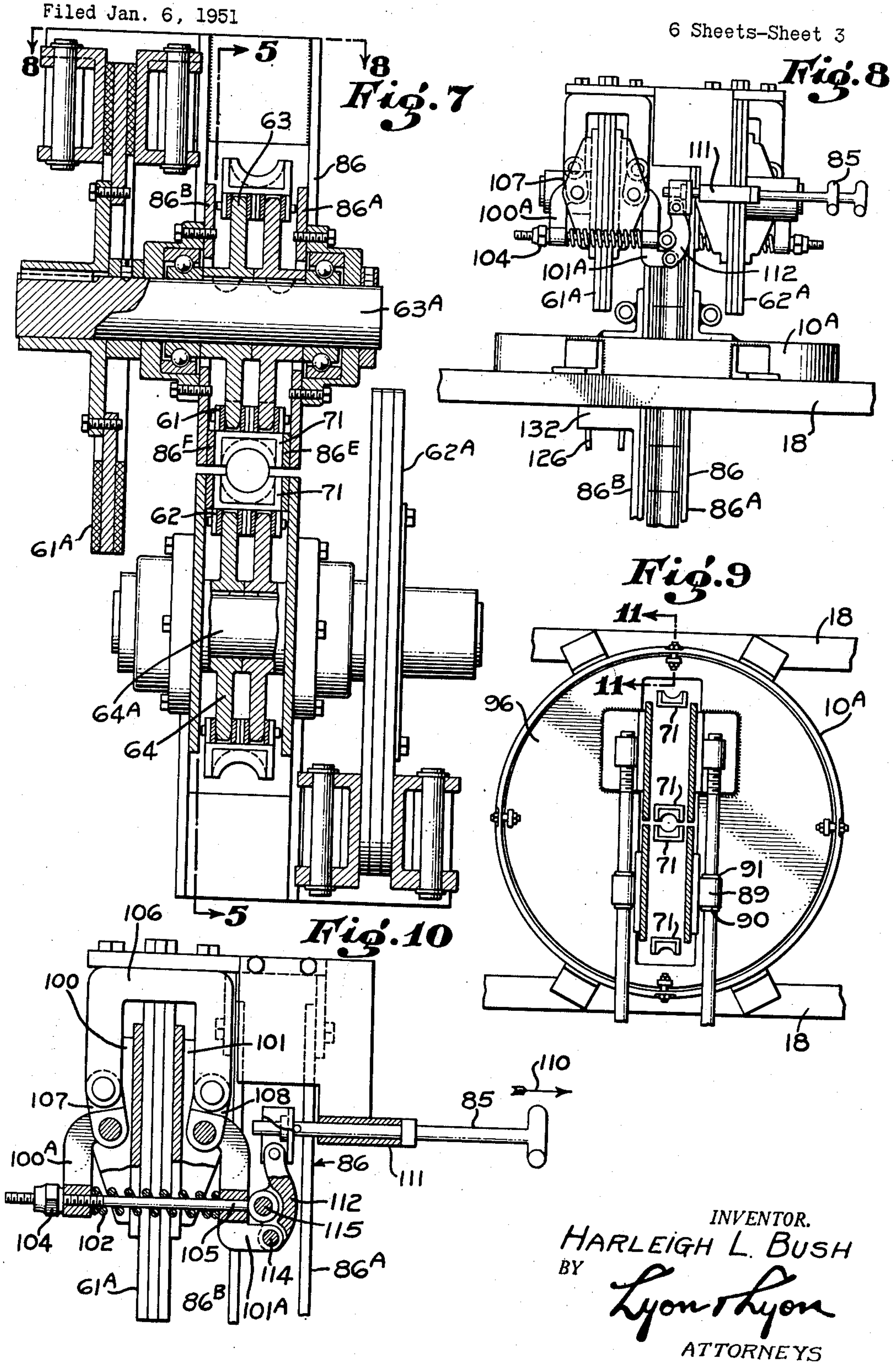
Figure 7 is a sectional view taken substantially on the line 7—7 of Figure 4.
Figure 8 is a view in elevation taken substantially in the direction indicated by the line 8—8 in Figure 7.
Figure 9 is a sectional view taken substantially on the line 9—9 of Figure 4.
Figure 10 shows in enlarged form a portion of the brake illustrated in Figure 8.
Figures 11, 12, 13, 14, 15, 16, 28:
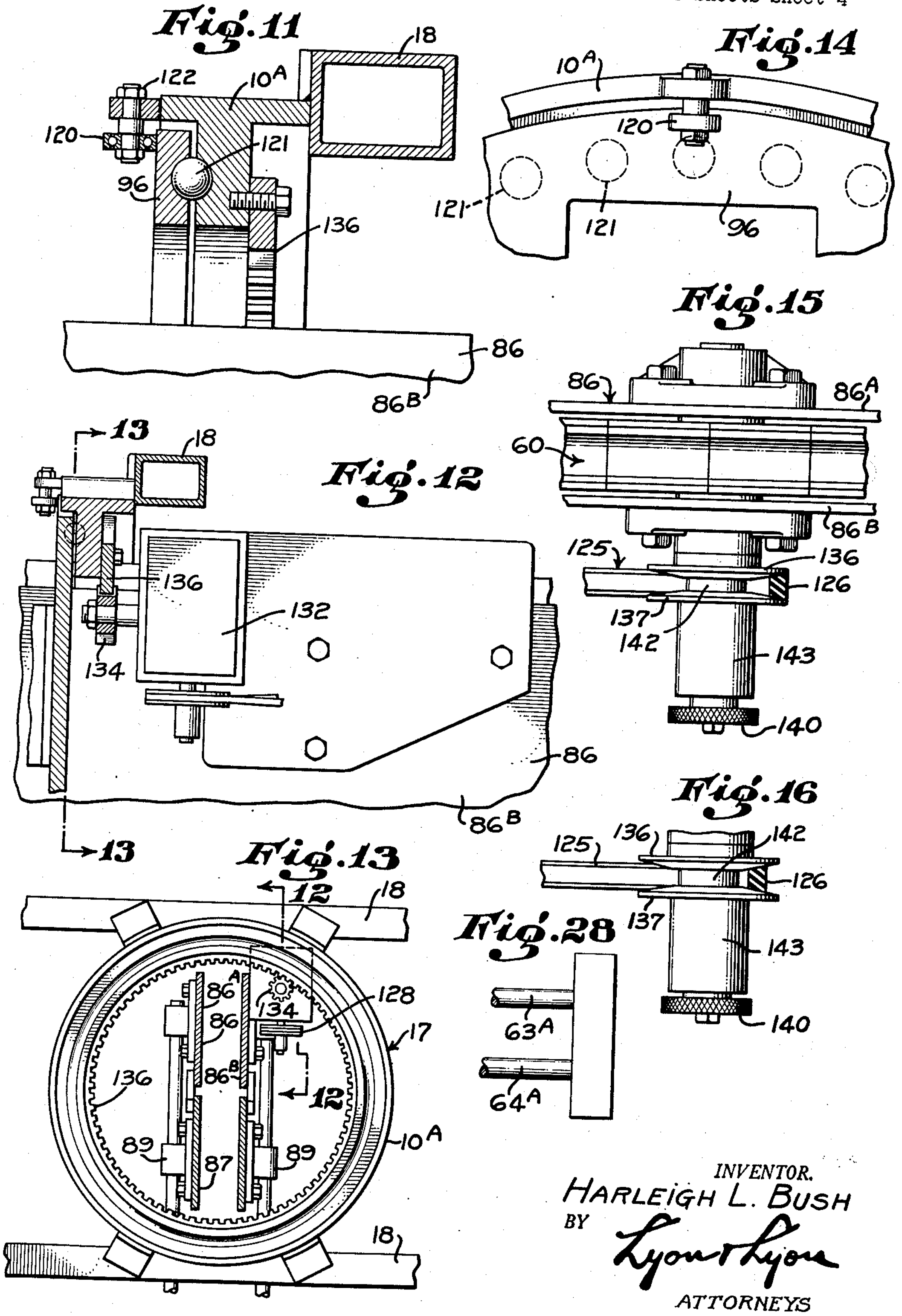
Figure 11 is a sectional view taken substantially on the line 11—11 of Figure 9.
Figure 17:
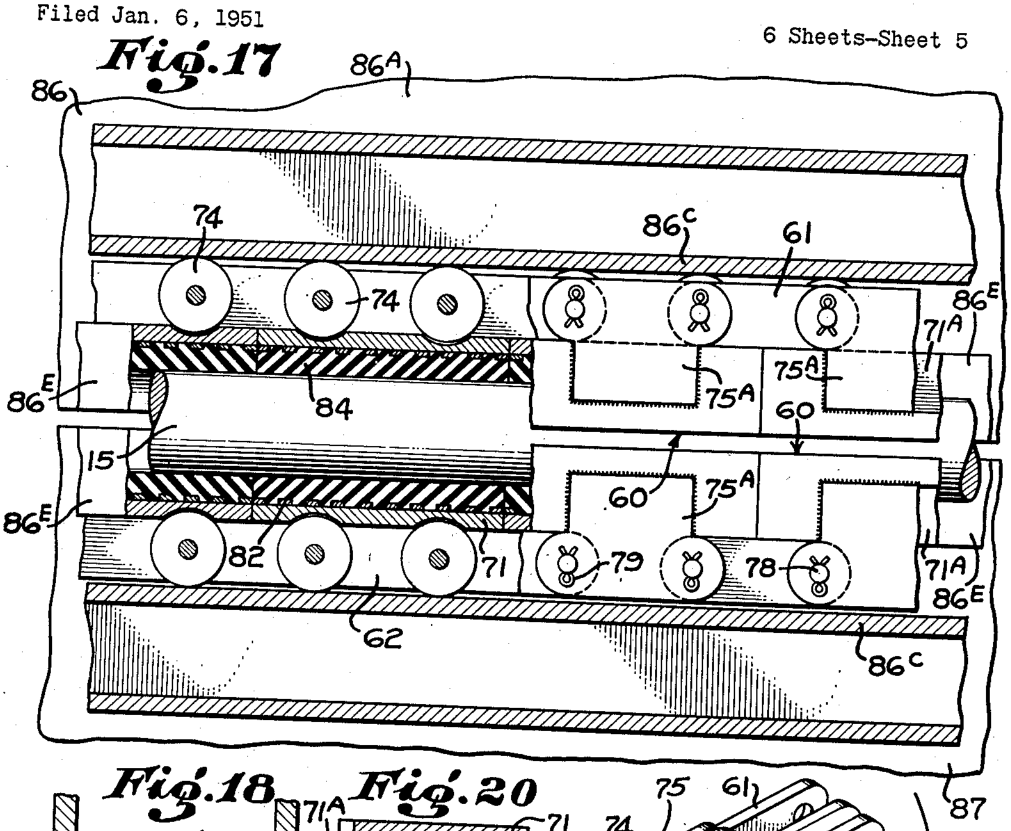
Figure 18:
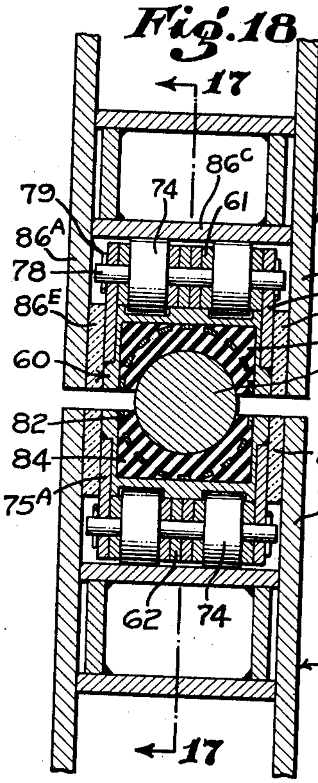
Figures 19, 20, 21:
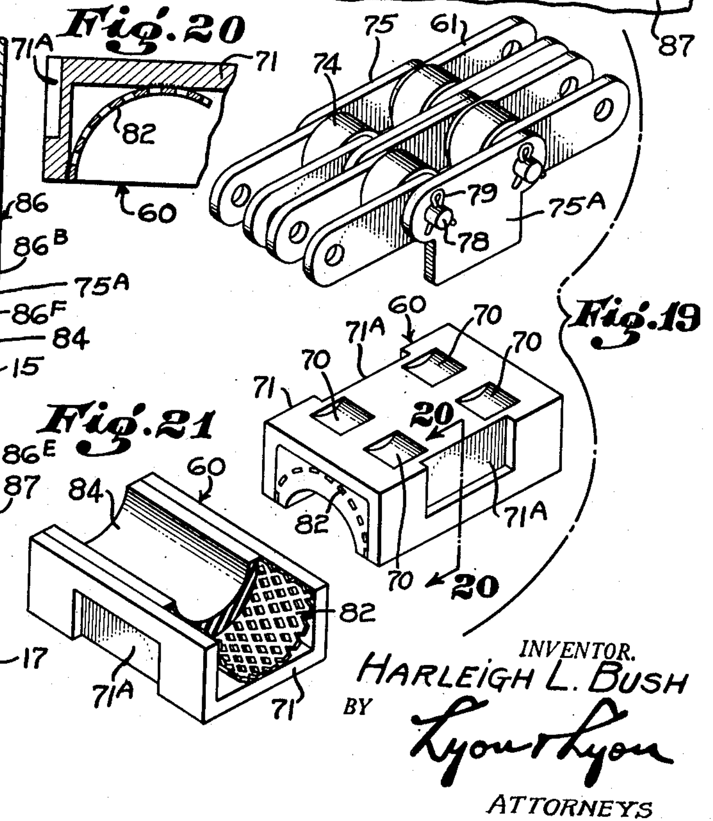
Figure 22:
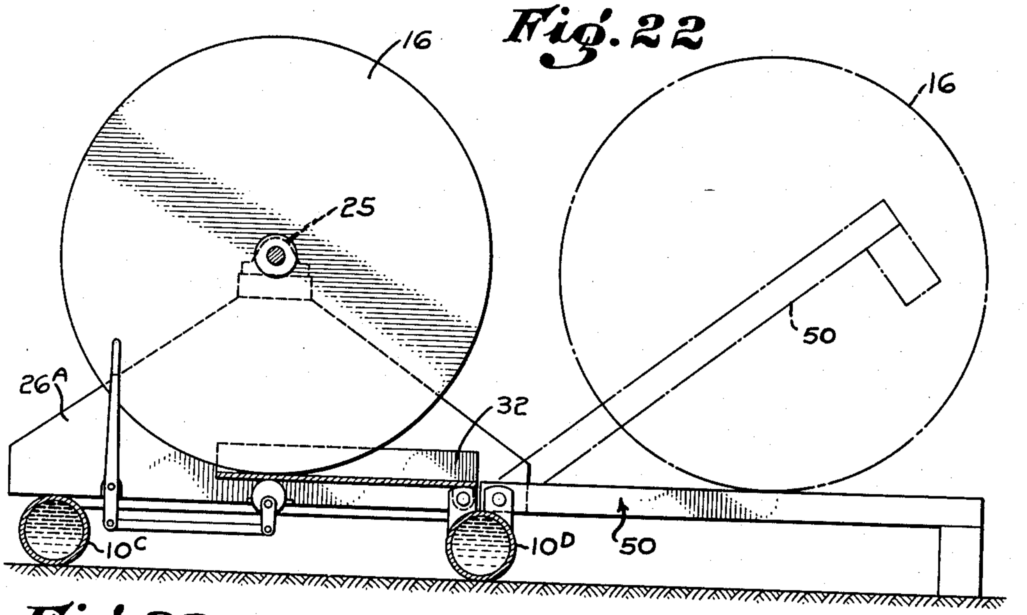
Figure 23:
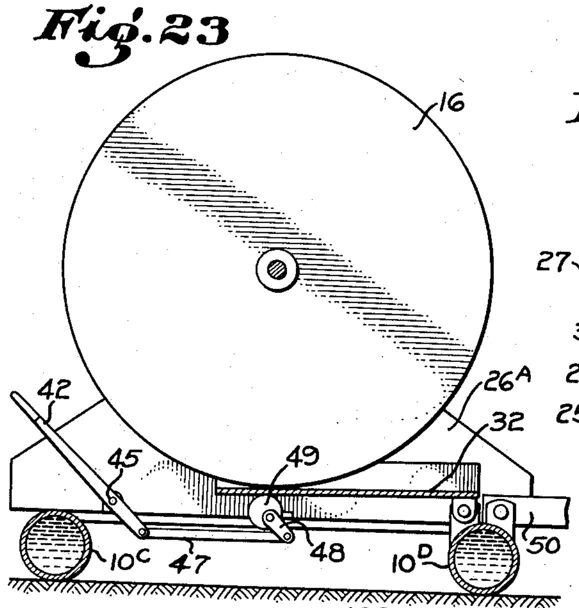
Figure 24:
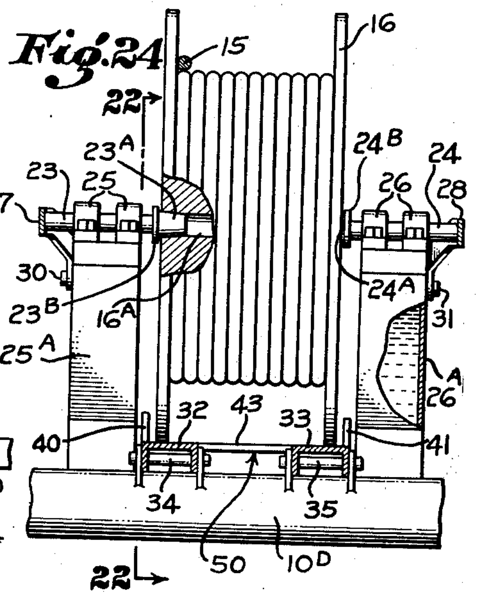
Figure 25:
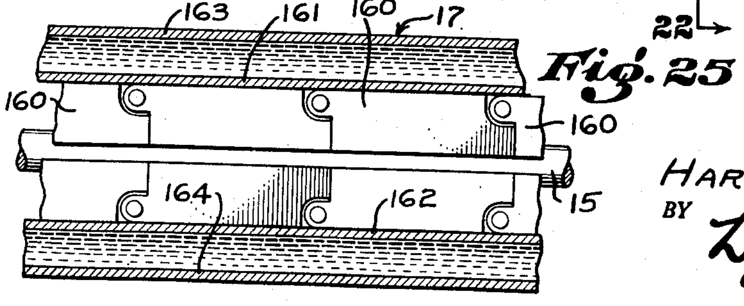

Figure 12 corresponds to a sectional view taken substantially on the line 12—12 of Figure 13;

Figure 13 is a sectional view taken substantially on corresponding lines 13—13 in both Figures 12 and 4;

Figure 14 shows a portion of the apparatus of Figure 9 in enlarged form;

Figure 15 is a view in elevation taken substantially in the direction indicated by the line 15—15 in Figure 4;

Figure 16 shows a portion of the structure of Figure 15 but in different operating positions;

Figure 17 is a sectional view taken substantially on the line 17—17 of Figure 18;

Figure 18 is a sectional view taken substantially on the line 18—18 of Figure 5;

Figure 19 is an exploded view showing in perspective the chain and associated rubber lined block detached;

Figure 20 is a sectional view taken substantially on the line 20—20 of Figure 19;

Figure 21 shows in perspective the cable gripping side of the rubber lined block of Figure 19 with a portion of the rubber lining removed for purposes of illustrating the manner in which the rubber lining removed for purposes of illustrating the manner in which the rubber lining is secured to the block;

Figure 22 is a view taken substantially on the line 22—22 of Figure 24, and the dotted lines shown therein are helpful in explaining the retractable nature of the auxiliary cable reel loading platform and the manner in which the cable reel is moved and is mounted for rotation;

Figure 23 is a view corresponding to the sectional view shown in Figure 22, but shows the braking handle in its normal operating position at the time cable is being dereeled from the reel;

Figure 24 is a sectional view taken substantially in the direction indicated by the line 24—24 in Figure 2;

Figure 25 is a sectional view through a modified structure which corresponds essentially to Figure 5;

Figure 26 is a view for the purpose of illustrating the manner in which a tractor or other vehicle is used to pay out the cable from the reel with the combination cable gripping and braking device taking substantially all of the tension imparted in the cable by the tractor;

Figure 27 is a view of the apparatus similar to the view shown in Figure 13 but of a modified structure incorporating trunnions 145, 146 which allow pivotal movement of the cable gripping and braking device 17 about a vertical axis corresponding to the aligned axes of the trunnions 145, 146; and Figure 28 represents in somewhat schematic form a reversible motor drive which may be used under some circumstances to drive the shafts 63A, 64A (Figure 5) for purposes of either paying in or paying out the cable 15 gripped by the device 17.

The arrangement for producing the aforementioned indicated results is preferably mounted on a mobile carriage 10 readily transportable to different locations as the cable stringing process progresses.

In general, in the cable stringing process, a tractor 5 as indicated in Figure 26 is used to pull the cable to positions adjacent the cable supporting towers 6 and to serve generally as an anchor for one end of the tensioned dereeled cable, the other end of the dereeled cable being gripped by the structure 17 through which the cable passes. The dereeled cable passes through suitable guide blocks 7 with rollers which are mounted on the towers in a temporary manner such that eventually workers on the tower may conveniently attach the dereeled cable in a permanent manner to insulators on the tower and remove the blocks.

Generally, the carriage 10 is constructed of interconnected hollow frame members as described in detail hereinafter which may be filled with liquid or sand as desired for purposes of ballast. The carriage 10 mounts three identical devices or structures 17 (only one of which is described in detail herein) through which cable or transmission line 15, originally supplied on a corresponding reel 16, is passed in the cable dereeling process. Such structure 17 incorporates combination gripping and braking means and is rotatably supported about the longitudinal axis of the cable 15 on a frame 18, the frame 18 being pivotally mounted on the carriage 10 so that in use of the equipment the ground engaging spades or spikes 19 at the lower end of the frame 18 may enter the ground to hold the frame 18 rigid.

Figure 1:
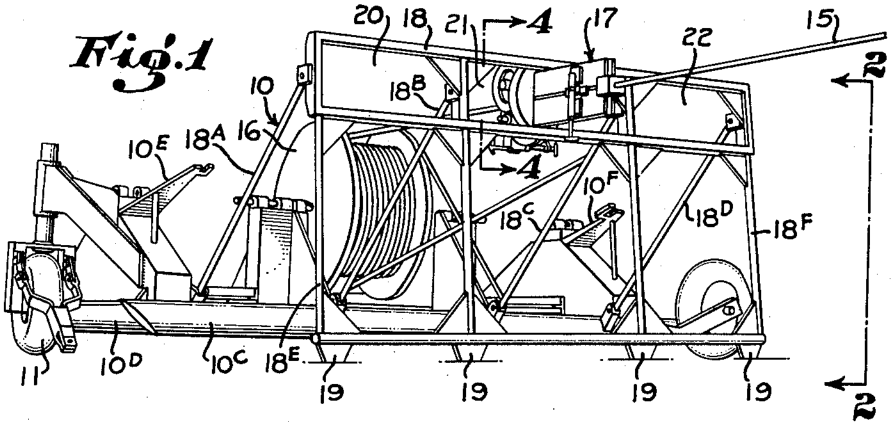
Figure 1 is a perspective view showing apparatus in a system embodying features of the present invention.

As shown in Figure 1, the frame 18 is provided with three bays 20, 21 and 22 for mounting identical devices 17 associated with a corresponding cable reel 16. Three bays 20, 21 and 22 are provided since the equipment is intended for use in stringing simultaneously the three cables in a three-phase transmission line.

The combination cable gripping and braking device 17 serves to take the stress of that portion of the cable 15 which lies between the cable reel 16 and the device 17, so that such cable portion between the drum 16 and device 17 may have slack to thereby prevent application of force to the cable yet on the cable supply reel 16.

The device 17 serves primarily to overcome the tension force present on that portion of the cable between the transmission line tower and the device 17. In prior art arrangements of this character, all or substantially all of the tension applied to the cable 15 while stringing the same between towers was applied to the reel 16, so that the tensioned portion of the cable tended to cut into the remaining cable turns on the drum and to abrade the same. As a matter of fact, the amount of the tension force which the cable reel 16 could withstand without detrimental effects determined the spacing between the transmission line towers. In the present invention the cable gripping and braking device 17 serves essentially to isolate the cable reel 16 from the forces present on that portion of the cable which extends from the device 17 to the transmission line tower.

*Cable reel structure and control*

The cable reel 16 is releasably mounted on the axles 23, 24 which in turn are rotatably supported in spaced bearings 25, 26, respectively. The inner ends of these axles 23, 24 are provided with tapered ends 23A, 24A and contiguous flanges 23B, 24B. The tapered ends 23A, 24A are adapted to frictionally engage and to bind themselves into the conventional cylindrical centrally apertured portion 16A of the cable reel 16. End thrusts of the shafts 23, 24 are taken up by the members 27, 28, which are releasably attached to the bearing supports 30, 31 and engage the outer ends of the shafts 23, 24. It is obvious that other means may be used if desired to take up the end thrust of the rotatable axles 23, 24, and the particular means shown is exemplary of such other means. Both of these members 27, 28 are releasably fixed to the corresponding bearing supports 30, 31 so that the same may be removed to permit axial movement of the associated shafts 23, 24 for purposes of allowing replacement of the supply cable spool 16. Since the conical or tapered ends 23A are in binding engagement with the wooden reel 16, the flanges 23B, 24B are provided to facilitate separation of these elements, as for example, by prying them apart using a crowbar between the flanges 23B, 24B and the reel.

Means are provided to brake or lock the cable reel 16 against rotation, and these means, perhaps best seen in Figures 22, 23 and 24, comprise a pair of parallel spaced plates 32, 33 of channel stock pivoted for movement as a unit about pivot pins 34 and 35. These plates 32, 33, joined together by cross brace 43, each have welded thereto rail members 40 and 41 and are movable upon actuation of the manually operable control handle 42. This control handle 42 is pivotally mounted at a point intermediate its ends on the shaft 45 on carriage 10, and has its lower end pin connected to one end of the link 47. The other end of the link 47 is pin connected to the crank member 48 which has mounted on its free end a rod 49 engaging the under surfaces of the plates 32 and 33.

It is apparent that counterclockwise or downward movement of the handle 42 in Figure 23 results in upward movement of the plates 32 and 33 into engagement with the spaced rims of the reel 16 to cause braking or locking of the same, depending upon the magnitude of force applied to the handle. The handle 42 may be used to brake or lock the cable reel 16 against rotation and, in fact, may be used as an emergency brake to withstand the tension to which any portion of the cable 15 is subjected in the event of, for example, failure of the device 17.

It is noted that the pivoted end of the cable braking plates 32, 33 lies on substantially the same plane as the loading platform 50, which is pivotally mounted on the carriage 10 for movement from the dotted line position shown in Figure 22 to the full line position, where it serves as a loading platform for the cable reel also shown in dotted lines. This loading platform 50 or reel stand, because of its pivotal mounting on the carriage 10, is transported with such carriage, the stand first being moved, for that purpose, inwardly towards the carriage and lashed to the carriage.

In loading the cable reel 16 it is essential, as indicated above, that the cylindrical apertured portion of the cable reel 16 be aligned with the axles 23, 24 (Figure 24). This alignment is accomplished, after the cable reel is reeled into position from the loading platform 50 onto the horizontally positioned braking platform 32, 33, by lifting the braking platform, using the handle 42 for that purpose, until the aligned condition is achieved. Then, the axles 23, 24 are inserted in position and the means 27, 28 placed in operative position to take up end thrust on such axles 23, 24, yet allowing them to rotate in the bearings 25, 26 with the cable reel. After such loading is accomplished, the plates 32, 33 are dropped and used thereafter for braking purposes as well as to facilitate removal of the empty reel.

The cable 15 is dereeled and strung out for attachment to the transmission line towers, using a tractor in the manner indicated in Figure 26.

In Figure 26 the end of the cable is attached to the tractor and is held in tension thereby either when and as the tractor moves or while it is stationary. The tractor moves, in this process, in the direction indicated by the arrow 5A, past the transmission line towers 6, and as the tractor reaches a particular tower the cable is raised, by means of a block or tackle or other means, to the top of the tower to a position where it is ultimately fastened by conventional means, not shown herein. This procedure is generally conventional, but in accordance with the present invention the tensioning of the cable 15, occasioned by movement of the tractor, is taken up by the combination gripping and braking device 17 instead of by the cable reel 16 itself. In such case the reach of cable between the reel 16 and device 17 is under appreciably no stress, only a stress sufficient to cause the reel 16 to rotate. This rotation of the reel 16 may be aided or produced entirely by manual efforts of the operators, if desired. To prevent undue rotation of the reel, the plates 32, 33 may be used either as an overrunning brake or as an emergency brake as described above.

The combination gripping and braking device 17 includes a plurality of rubber lined blocks 60 which are constructed as shown in Figures 18, 19, 20 and 21 and are mounted on a pair of endless chains 61 and 62. The chains 61, 62, as seen in Figure 5, pass over sprocket wheels, the chain 61 passing over spaced sprocket wheels 63, 65 and the chain 62 passing over spaced sprocket wheels 64, 66. These chains 61, 62 pivotally support a plurality of such blocks 60 in the manner described hereinafter.

The blocks 60 as seen in Figures 19 and 21 are generally of channel construction with four reentrant portions 70 in the back of the metal channel backing member 71, such reentrant portions providing clearance openings for the rollers in the endless chains. These rollers are all of structure identical to those shown at 74 in Figure 19. Further, the sides of the backing member 71 are provided with a pair of apertured portions 71A adapted to receive the downwardly extending projections 75A of the chain connecting links 75, such projections 75A being securely welded to the sides of the channel backing member 71. These chain links 75, in turn, are releasably secured to the chain connecting pins 78 by means of cotter pins 79, so that when and as desired or required, for replacement or repair purposes, the individual blocks 60 may be removed and replaced.

The channel backing member 71, of generally internal rectangular cross section, is made arcuate in shape by welding a bowed expanded metal strip 82 thereto. This bowed expanded metal strip 82, in turn, has its outer face lined with resilient material 84 such as rubber or the like, such resilient material being affixed in position by vulcanizing or by other expedients so that it may firmly engage the cable 15 in its passage through the structure 17.

It is noted in Figures 5 and 18, that a pair of such rubber lined blocks 60 is on diammetrically opposite sides of the cable 15, and such pair is adjustably spaced, by means described in detail hereinafter, to firmly grip such cable to prevent relative slipping movement between the cable and the block while such cable is under tension. Such pairs of rubber lined blocks 60, on diammetrically opposite sides of the cable 15, thus form a part of the cable gripping mechanism. In order to retard or prevent the movement of the cable 15 through the structure 17, braking or locking means described in detail hereinafter are associated with each of the endless chains 61, 62 which mount the rubber lined cable gripping blocks 60.

In order to effect such retarded movement of the chains 61, 62, brake discs 61A, 62A are mounted respectively on the sprocket shafts 63A, 64A, associated with corresponding chains 61, 62 for movement with such chains. Each of these brake discs 61A, 62A has manually operated braking controls of the type shown in Figure 10 which are effective upon manual operation of the control rod 85 to apply pressure to the corresponding brake discs 61A, 62A.

Figure 6:
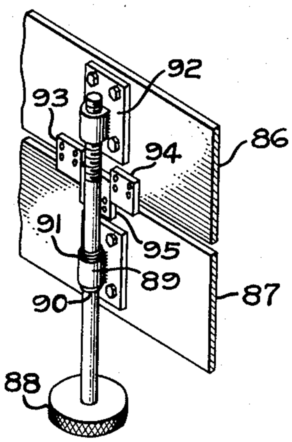
Figure 6 is a perspective view showing a portion of the apparatus shown in Figure 4.

More specifically, each of the endless chains 61, 62 is mounted on relatively movable frame members 86, 87, respectively (Figures 4 and 5). The spacing between these frame members 86, 87, and hence the spacing between the pairs of rubber lined gripping blocks, may be adjusted upon manual operation of the pair of adjustment bolts 88 (Figure 6), to thereby adjust the gripping force applied to the cable 15. The adjustment bolt 88 passes through a collar 89 affixed to the lower frame member 87, such bolt 88 having welded thereto a pair of spaced rings 90, 91 on opposite sides of the collar 89 to prevent longitudinal movement of the bolt with respect to the frame member 87. The upper end of the bolt 88, however, has screw threads thereon cooperating with the screw threads in the threaded sleeve 92 affixed to the frame member 86, whereby the frame member 86 is moved either closer to or further from the member 87, depending upon the direction of rotation of the adjustment bolt 88. During such relative movement the frame members 86, 87 are guided with respect to each other by means of the guides in the form of plates exemplified by the plates 93, 94 on frame member 86 cooperating with the guide plate 95 on frame member 87.

The frame member 86, thus joined by means of adjustment bolts 88 to the frame member 87, has welded thereto a circular plate 96 (Figures 9 and 11) which in turn is journaled for rotation on the stationary carriage frame 10. The purpose for thus rotatably supporting the frame members 86, 87 for rotation about the axis of the cable 15 passing therethrough is to prevent "birdcaging" of the standard cable, and the structure whereby this is accomplished is described in detail hereinafter. It is sufficient, for present purposes, to note that the upper frame member 86 is mounted on the carriage frame 10, and that turning of the adjustment bolts 88 results in either upward or downward movement of the other frame member 87, depending upon the direction of rotation of such adjustment bolts 88.

Referring to Figures 5 and 18, the frame members 86, 87 are of generally the same box construction, and for that reason a detailed description of the frame member 86 serves likewise to describe the construction of the other frame member 87.

The frame member 86 as seen in Figure 18 includes a pair of vertically spaced plates 86A, 86B, which is spaced by a horizontally extending hardened chrome-moly wear plate 86C, such plate 86C being firmly affixed to the spaced plates 86A, 86B in a unitary box construction. One surface of such plate 86C serves as a bearing surface for the rollers 74 on the chain 61 and extends substantially the entire distance between sprocket wheels 63, 65. These side plates 86A, 86B have also mounted thereon longitudinally extending bearing plates 86E, 86F, respectively, adapted to contact the sides of the rubber lined blocks 60 to guide the same. In general, therefore, the movement of the rubber lined blocks 60 is guided by such bearing plates 86E, 86F as well as the wear plate 86C.

Further, since each one of the brake structures, including respectively the brake discs 61A, 62A, are of identical construction, a detailed description of the brake associated with the disc 61A serves likewise as a description of the braking mechanism associated with the disc 62A. The brake disc 61A mounted on the same shaft as sprocket 63, for joint movement with the endless chain 61, passes between a pair of spring biased brake shoes 100, 101. The position of these brake shoes 100, 101 is controlled by the position of the manually operated rod 85, although it is noted that the brake shoes 100, 101 are normally held in adjusted braking position by means of the coil compression spring 102, the tension of which may be adjusted by the adjustment nut 104 threaded on the rod 105 passing through the helical coil spring 102. The brake shoes 100, 101 are pivotally mounted on the U-shaped bracket 106 depending from the frame member 86. For this purpose pivoted link members 107, 108, each pin connected at their extremities, interconnect the brake shoes 100, 101 and bracket 106. The lower extremities 100A and 101A of the brake shoes 100, 101 are each pressed by opposite ends of the coil compression spring 102, to thereby press the brake shoes 100, 101 in engagement with the brake disc 61A with a normal force depending upon the adjusted position of the nut 104. In order to increase or decrease the braking force on the brake disc 61A, the manually operated control rod 85 is moved in a corresponding outward or inward direction, the outward direction being indicated by the arrow 110.

Specifically, the control rod 85 is slidably mounted in the sleeve 111 affixed to the frame member 86. The inner end of the rod 85 has a link member 112 pin connected thereto, the opposite end of the link member 112 being pin connected to the brake shoe extension 101A, while an intermediate portion of such link 112 is pin connected to an eyelet on the adjustment bolt 105 passing through the spring 102. Thus, upon outward movement of the control rod 85 in the direction indicated by the arrow 110, the link 112 is pivoted in a clockwise direction initially about the axis of the pin 114 which serves to interconnect the link 112 to the extension 101A, and then subsequently about the axis of the pin 115 which passes through the eyelet of the bolt 105. Such initial pivoted movement of the link 112 about the axis of pin 114 causes pivotal movement of the brake shoe 100 towards the disc 61A. Subsequently, continued pivotal movement of the link 112 is about the axis of the pin 115 to cause movement of the other brake shoe 101 towards the brake disc 61A. Conversely, movement of the control rod 85 in the direction opposite to that shown by the arrow 110 results in releasing of braking forces to the braking disc 61A.

While a specific type of braking means is described for retarding or locking the movement of corresponding endless chains 61, 62, it is apparent that other braking means may be used, and the particular braking means described, per se, forms no part of the present invention.

As indicated above, the frames 86, 87 are mounted for rotational movement as a unit about the axis of the cable 15 passing between such frames 86, 87. The specific means whereby such rotational mounting is effected is described now in relationship to Figures 9, 11, 12, 13 and 14. The frame member 86, as shown in Figure 9, has welded thereto the circular disc 96 which is rotatably supported on the carriage frame 10. To facilitate movement of the disc 96, a plurality of antifriction means is provided. The antifriction means as shown in Figure 11 includes roller bearings 120 disposed on one side of the disc 96 and a plurality of ball bearings 121 disposed on the other side of the disc 96. The balls 121 are disposed within cooperating recesses in the disc 96 and the annular stationary frame member 10A. The roller bearings 120 are rotatably supported on a pin 122 affixed to the frame member 10. These antifriction means 120, 121 serve likewise to take up end play in the disc 96, and for this purpose are uniformly spaced about the circumference of the disc 96.

The purpose of thus rotatably supporting the frames 86, 87 for rotation about the axis of the cable 15 is to prevent "birdcaging" of cable which comprises spirally wound strands. The speed at which the frame members 86, 87 are thus rotated depends upon the pitch of the spiral strands; and for a given cable, the speed at which the frame members 86, 87 are thus rotated as a unit is a direct function of the linear speed of the cable through the structure 17. While the cable gripping means supported on the frame members 86, 87 may be manually rotated to achieve this general purpose, preferably the frame members 86, 87 are rotated as a unit automatically. For this purpose the belt drive indicated by the general reference numeral 125 in Figure 4 is provided. A belt 126 passes over the spaced pulleys 127, 128, the pulley 127 being mounted, as shown in Figures 4, 5 and 15, on the same shaft which supports the sprocket 65, so that the sprocket 65 and pulley 127 move together as a unit.

The pulley 128 is mounted on the input shaft 130 of the right angle gearbox 132. The output shaft of the gearbox mounts a driving gear 134 which is constantly in mesh with the ring gear 136 bolted to the stationary frame member 10A as shown in Figure 11.

Since the ring gear 136 is stationary, rotation of the gear 134 causes rotation of the frame members 86, 87 about the axis of the cable 15.

The speed at which such rotation of the frame members 86, 87 takes place depends upon the speed of the cable 15 passing through the gripping device 17. This speed may, for example, be nine revolutions per 500 feet of cable passing through the device 17, the exact number of revolutions being determined by the pitch of the outer spiral strands on the cable to prevent "birdcaging" and to, in fact, compact uniformly such outer strands.

As indicated above, the frames 86, 87, movable as a unit, may be moved manually if desired, or if the automatic mechanism described hereinabove is used, preferably the belt drive 125 is made adjustable in speed, using for example the expedient shown in detail in Figures 15 and 16, wherein means are provided whereby the belt 126 may ride on different portions of the adjustably spaced pulley flanges 136, 137. The spacing between such pulley flanges 136, 137 may be adjusted by turning the knurled adjusting nut 140. For this purpose the pulley half 137 is slidably mounted on the pulley shaft 142 and is in engagement with the sleeve 143 which is also slidably mounted on the shaft 142. By turning the knurled adjustment nut 140, the sleeve 143 and pulley half 137 are slid closer to or further from the other pulley half 136, depending upon the direction of rotation of the adjustment nut 140. The adjacent faces of pulley halves 136, 137 are tapered to allow gripping contact with the wedge cross section belt 126, which thus contacts either an inner or outer portion of the pulley 136, 137, depending upon the spacing between pulley halves 136, 137.

While, as described above in relationship to Figures 11 and 13, the frame member 10A is rigidly affixed to the carriage frame 10, preferably, as shown in Figure 27, the corresponding carriage frame 110A is trunnioned by means of trunnions 145, 146 on the stationary carriage frame 10, so that the composite cable gripping and braking device 17 may be pivoted about a vertical axis for a distance of 15° either to the right or to the left, as seen in Figure 27, so that the device 17 may automatically position itself in correct oriented relationship with respect to the cable reel and the reach of cable which extends in the direction of the first tower. This oriented direction, of course, changes gradually since the adjacent cable turns on the reel are spaced horizontally, i. e., the cable being conveniently disposed in layers on the cable reel 16 as shown in Figure 24. By this expedient shown in Figure 27, the unit 17 thus automatically pivots about the aligned axes of the trunnions 145, 146, i. e., about a vertical axis, to assure the absence of kinking and a more uniform handling of the cable by the gripping device 17.

Figure 25 illustrates a modified structure whereby the cable 15 is continuously gripped by rubber lined articulated blocks 160, corresponding to the rubber lined blocks 60 shown in the previous figures. However, instead of providing antifriction means for accommodating movement of the chain of blocks 160, the outer surfaces of such blocks 160 continuously rub against hardened extended bearing surfaces 161, 162 on opposite sides of the cable 15. Since a relatively large amount of heat is developed as a result of the friction between the chain of blocks 160 and such bearing surfaces 161, 162, a cooling water jacket 163, 164 is in communication with such bearing surfaces 161, 162, respectively, for heat transfer and dissipation purposes. In other respects the arrangement shown in Figure 25 incorporates the structures described in detail hereinabove.

In all of the arrangements described above, the cable passing through the device 17 is uniformly and continuously gripped by rubber lined blocks, the speed of which may be controlled with an associated braking means. The direction of movement of the cable in the gripping device is from the rear outwardly in the direction of the first tower, such motion being produced by movement of the pulling tractor as indicated in Figure 26. In long runs of the cable it is sometimes desirable, for purposes of taking up slack in the extended cable length closest to the device 17, to pay in some of the cable, and in such case, if desired, a motor may be coupled to the sprocket shafts 63A, 64A (Figure 5) for driving these shafts as a unit. Preferably, in this instance the motor includes a reversible drive whereby the cable 15 may be moved either to the right or to the left in Figure 5, depending upon the direction of the drive. It is believed that this arrangement is obvious to one skilled in the art, having in mind the teachings and structures shown herein, and for that reason such reversible motor drive is shown in schematic form in Figure 28.

Preferably, as mentioned above, the carriage frame 10 includes a plurality of hollow structural elements which may be filled either with sand or water, as desired or believed necessary, for providing a rigid anchor for the extended length of cable, particularly when the pull on the cable 15 may be in the order of 4,000 pounds when cable having a weight of approximately 1¼ pounds per foot is being strung. Specifically, for this purpose, as indicated in Figure 23, the skids 10C, 10D (Figure 23) adapted to rest on the ground are hollow and are shown as being filled with water. Also, for the same purpose, as shown in Figure 24, the upstanding bearing supports 25A, 26A, are likewise shown filled with water. In this respect, also of importance is the manner in which the frame 18 is associated with the carriage 10. Specifically, the spades or spikes 19 serve also to anchor the equipment, and the pivoted connecting arms 18A, 18B, 18C, 18D (Figure 1) having opposite ends thereof pin connected, on the one hand, to the carriage 10 and, on the other hand, to the frame 18, provides a long lever arm which tends to overcome the tendency of the carriage 10 to be tipped in the direction of the tensioned cable. This expedient also allows convenient assembly for transport purposes. Thus, when it is desired to move the equipment to a different location, the frame 18 as a unit is swung in towards the carriage 10 to a position where the upstanding frame members 18E, 18F are engaged by the bifurcated supports 10E, 10F on the carriage to which such frame may be lashed as a unit.

Figure 3:
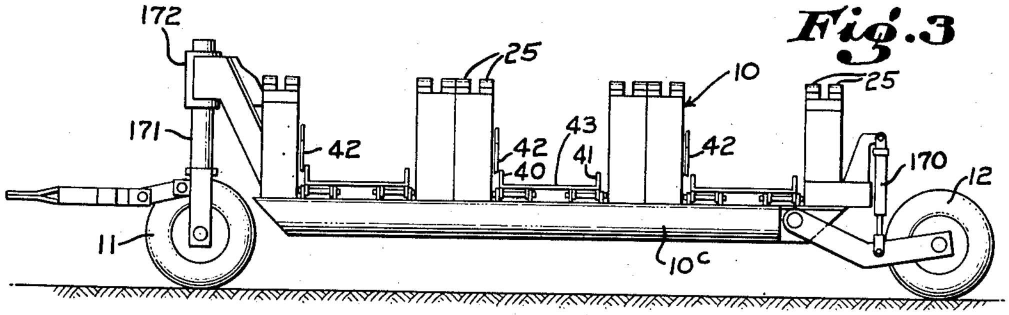
Figure 3 is a view of the rear of the carriage shown as indicated by the lines 3—3 in Figure 2, but with the cable reel and frame supporting the combination cable gripping and brake device omitted.

While in use, the carriage skids 10C, 10D, as shown in Figures 22 and 23, rest on the ground and of course they are raised above the ground while the equipment is being transported. To effect such raising, and for purposes of maintaining such skids in raised position conventional means, per se forming no part of the present invention, may be used to elevate the carriage 10 with respect to the forward and rear wheels of the carriage. As shown in Figure 3, hydraulically operated means 170 may be used in connection with the rear wheels, while other means such as manually operated jacks may be used to move the upstanding wheel spindle 171 with respect to the bearing 172. Means not shown are used to maintain the bearing 172 in adjusted position with respect to the spindle 171.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the character described, a cable reel having a cable thereon, a carriage rotatably supporting said reel, said reel having a pair of spaced peripheral edges, a bottom plate pivotally mounted on said carriage, manually operable means arranged, upon actuation, to pivot said plate into engagement with said peripheral edges to thereby brake the reel, a combined gripping and brake structure mounted on said carriage, said structure comprising a pair of endless belts, each of said belts comprising a plurality of articulated resilient blocks, with blocks of opposite pairs disposed adjacent each other and adapted to grip the cable supplied from said reel therebetween, and adjustable brake means restraining the movement of said pair of belts.

2. In equipment of the character described, a cable reel mounted for rotation whereby cable thereon may be unreeled therefrom, a combined cable gripping and brake structure through which said cable passes, said structure incorporating means whereby said cable is continuously and resiliently engaged in its passage therethrough, said structure incorporating brake means whereby the movement of the cable through said structure is retarded, and means whereby said structure, as a unit, may be swiveled about the axis of the cable.

3. In equipment of the character described, a carriage, said carriage incorporating means whereby a cable reel may be rotatably supported thereon so that a cable reeled thereon may be removed therefrom, a combined cable gripping and brake structure, means rotatably mounting said structure on said carriage, said structure incorporating means whereby cable passing therethrough is resiliently and continuously engaged thereby, and said structure incorporating brake means whereby the movement of said cable gripping means is retarded.

4. In equipment of the character described, a carriage, said carriage incorporating means whereby a cable reel may be rotatably supported thereon so that cable on said reel may be dispensed therefrom, said reel having a peripheral edge, a bottom plate pivoted on said carriage, manually operable means arranged, upon actuation, to pivot said bottom plate into engagement with said peripheral edge to thereby brake the movement of the reel, a combined cable gripping and brake structure, means rotatably mounting said structure on said carriage about the axis of the cable passing therethrough, said structure incorporating means whereby the cable passing therethrough is resiliently and continuously engaged thereby, and said structure incorporating brake means whereby the movement of said cable incorporating means is retarded.

5. In apparatus of the character described, a carriage, means mounted on said carriage for rotatably supporting a cable reel having a cable thereon about substantially a horizontal axis, a combined cable gripping and braking device, a frame pivotally mounted on said carriage and having ground engaging spikes, means rotatably supporting said device for rotation about an axis corresponding to the longitudinal axis of the cable supplied from said reel passing therethrough, said last mentioned means incorporating means whereby said device may be pivoted about substantially a vertical axis.

HARLEIGH L. BUSH.

References Cited in the file of this patent

UNITED STATES PATENTS

| Number | Name | Date |
|---|---|---|
| 1,716,229 | Immel et al. | June 4, 1929 |
| 1,836,815 | Reeves | Dec. 15, 1931 |
| 1,895,217 | Van Vorst | Jan. 24, 1933 |
| 1,896,415 | Pyles | Feb. 7, 1933 |
| 2,103,295 | Mucha | Dec. 28, 1937 |
| 2,245,788 | Kempe | June 17, 1941 |
| 2,400,739 | Burge | May 21, 1946 |
| 2,507,774 | Foley | May 16, 1950 |